No. 880,373. PATENTED FEB. 25, 1908.
R. ESCALES & M. NOVAK.
PROCESS OF ACCELERATING THE SEPARATION OF NITROGLYCERIN FROM ACIDS.
APPLICATION FILED SEPT. 5, 1907.

WITNESSES:

INVENTORS
RICHARD ESCALES
MILANO NOVAK
BY
ATTORNEYS

UNITED STATES PATENT OFFICE.

RICHARD ESCALES AND MILANO NOVAK, OF MUNICH, GERMANY.

PROCESS OF ACCELERATING THE SEPARATION OF NITROGLYCERIN FROM ACIDS.

No. 880,373.　　　　　Specification of Letters Patent.　　　Patented Feb. 25, 1908.

Application filed September 5, 1907. Serial No. 391,492.

*To all whom it may concern:*

Be it known that we, RICHARD ESCALES and MILANO NOVAK, citizens of the Kingdom of Bavaria, Empire of Austria-Hungary, respectively residing at Munich, Bavaria, Germany, have invented certain new and useful Improvements in Processes of Accelerating the Separation of Nitroglycerin from Acids; and we do hereby declare the following to be a full, clear, and exact description of the invention, such as will enable others skilled in the art to which it appertains to make and use the same.

This invention relates to an improved process for accelerating the separation of nitroglycerin from acids.

In the manufacture of nitro-glycerin during the first and also the second separation of the nitro-glycerin from waste mixed acids, there is considerable danger due to the slowness of the process of separation.

By the present invention the nitro-glycerin is separated in a few minutes, either in the extraction of the same from the solution or when cleansing the waste acids. This is done by passing an electric current through the solution containing the nitro-glycerin, the electrodes being suitably formed of platinum wire, the one being arranged on the bottom of the recipient and the other near the surface of the solution. Instead of platinum wire electrodes others of suitable material and shape may be used.

Figure 1:
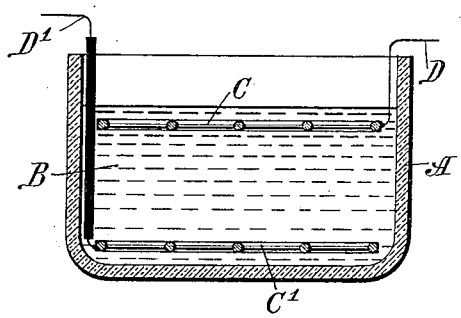
Figure 2:
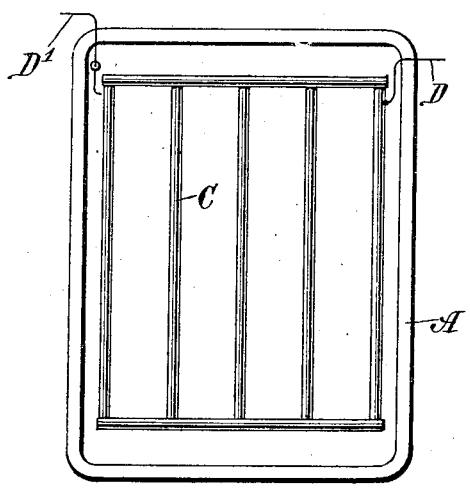

An apparatus suitable for carrying out our invention is shown in the accompanying drawing, in which Figure 1 is a cross section and Fig. 2 a plan view of such apparatus.

The vessel A made of glass or other suitable material contains the electrolyte B (solution containing nitroglycerin) and the electrodes C, C', made of platinum wire and arranged one on the bottom of the vessel and the other near the surface of the solution. Current is conveyed to the electrodes through wires D, D'.

The small gas bubbles formed during the electrolysis draw the nitro-glycerin, suspended in the mixed acids, to the surface of the same from whence it can be easily removed. To assist the process small percentages of water, sodium fluorid, etc., can be added to the acids either before or during the electrolysis.

The process is principally intended to be used at the second separation, that is, for cleaning the waste acids. The advantages of this process are the following: 1. Complete extraction of the nitro-glycerin from the waste acids in a very short time. 2. The waste acids do not lose concentration or become dirty, which is of great value in the extraction of the remaining acids. 3. The process itself is absolutely free from danger and its use reduces the danger in a nitroglycerin factory.

Having now particularly described and ascertained the nature of our said invention and in what manner the same is to be performed, we declare that what we claim is:

1. The process of separating nitroglycerin from mixed acids, which consists in passing an electric current between electrodes through a liquid mixture of acids, and nitroglycerin, thereby causing the evolution of gas bubbles from the electrodes which carry the nitroglycerin particles upward, and then removing the nitroglycerin from the surface of the liquid.

2. The process of separating nitroglycerin from mixed acids, which consists in adding to the mixture an electrolyte which will facilitate the carrying out of the process, then passing an electric current between electrodes, through the liquid, thereby causing the evolution of gas bubbles from the electrodes which carry the nitroglycerin particles upward, and then removing the nitroglycerin from the surface of the liquid.

3. The process of separating nitroglycerin from mixed acids, which consists in adding to the mixture of acids and nitroglycerin, an aqueous electrolyte containing a soluble salt, passing an electric current from an anode to a cathode through the liquid, causing the nitroglycerin to rise to the surface by the evolution of gas from the electrodes, and removing the nitroglycerin from the top of the liquid.

4. The process of separating nitroglycerin from mixed acids, which consists in adding to the mixture of acids and nitroglycerin an aqueous electrolyte containing sodium fluorid, passing an electric current from an anode to a cathode through the liquid, causing the nitroglycerin to rise to the surface by the
5 evolution of gas from the electrodes, and removing the nitroglycerin from the top of the liquid.

In testimony whereof we hereunto affix our signatures in the presence of two witnesses.

RICHARD ESCALES.
    MILANO NOVAK.

Witnesses:
 LOUIS F. MUELLER,
 GEORG KÖRNER.